(12) United States Patent
Akada et al.

(10) Patent No.: US 9,440,626 B2
(45) Date of Patent: Sep. 13, 2016

(54) DRUM BRAKE TYPE ELECTRIC PARKING BRAKE APPARATUS

(71) Applicant: AKEBONO BRAKE INDUSTRY CO., LTD., Tokyo (JP)

(72) Inventors: Hironori Akada, Tokyo (JP); Hiroyasu Ishikawa, Tokyo (JP); Michio Suzuki, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 13/710,671

(22) Filed: Dec. 11, 2012

(65) Prior Publication Data

US 2013/0153349 A1    Jun. 20, 2013

(30) Foreign Application Priority Data

Dec. 14, 2011    (JP) .................................. 2011-272923

(51) Int. Cl.
*F16D 51/00* (2006.01)
*B60T 1/06* (2006.01)
(Continued)

(52) U.S. Cl.
CPC ............... *B60T 1/067* (2013.01); *F16D 51/48* (2013.01); *F16D 51/28* (2013.01); *F16D 2051/003* (2013.01); *F16D 2051/005* (2013.01); *F16D 2055/0037* (2013.01); *F16D 2121/24* (2013.01); *F16D 2125/34* (2013.01); *F16D 2125/48* (2013.01); *F16D 2125/60* (2013.01); *F16D 2125/68* (2013.01); *F16D 2125/70* (2013.01); *F16D 2131/00* (2013.01)

(58) Field of Classification Search
CPC .. F16D 65/10; F16D 2051/003; F16D 51/16; F16D 51/18; F16D 51/20; F16D 51/22; F16D 51/26; F16D 51/28
USPC .......................... 188/2 D, 325–343, 156–162
See application file for complete search history.

(56) References Cited

U.S. PATENT DOCUMENTS 4,219,923 A * 9/1980 Marti ...................... B60T 1/067
                                                                        188/18 R
4,374,554 A    2/1983  Colpaert
(Continued)

FOREIGN PATENT DOCUMENTS

CN       101627221 A      1/2010
JP        09060667 A  *   3/1997
(Continued)

OTHER PUBLICATIONS

Machine Translation of JP 09-060667 (no date).*
(Continued)

*Primary Examiner* — Nicholas J Lane
(74) *Attorney, Agent, or Firm* — Drinker Biddle & Reath LLP

(57) ABSTRACT

There is provided a drum brake type electric parking brake apparatus includes an electric actuator unit, a backing plate and a knuckle. The electric actuator unit includes an electric motor and a decelerator, and expands a gap between one end portions of the brake shoes based on activation of the electric motor. The electric actuator unit is separately provided from the backing plate. The electric actuator unit is arranged at an inner-side surface of the knuckle, and the backing plate is arranged at an outer-side surface of the knuckle. The backing plate and the electric actuator unit are supported and fixed to the knuckle.

4 Claims, 10 Drawing Sheets

(51) Int. Cl.
*F16D 51/48* (2006.01)
*F16D 51/28* (2006.01)
*F16D 55/00* (2006.01)
*F16D 121/24* (2012.01)
*F16D 125/34* (2012.01)
*F16D 125/48* (2012.01)
*F16D 125/60* (2012.01)
*F16D 125/68* (2012.01)
*F16D 125/70* (2012.01)
*F16D 131/00* (2012.01)

(56) References Cited

U.S. PATENT DOCUMENTS

| | | | |
|---|---|---|---|
| 6,360,852 B1* | 3/2002 | Sherman, II | F16D 63/004 188/327 |
| 6,408,994 B1* | 6/2002 | Maehara | 188/156 |
| 6,581,729 B1* | 6/2003 | Moriwaki | 188/2 D |
| 6,666,302 B2* | 12/2003 | Mizuno et al. | 188/2 D |
| 8,011,482 B2* | 9/2011 | Boyle et al. | 188/2 D |
| 2004/0055833 A1* | 3/2004 | Tatsumi et al. | 188/2 D |
| 2005/0145451 A1* | 7/2005 | Kelly | F16D 51/22 188/79.54 |
| 2008/0067020 A1* | 3/2008 | Barbosa | F16D 51/48 188/325 |
| 2009/0260929 A1 | 10/2009 | Boyle et al. | |
| 2009/0314593 A1* | 12/2009 | Schmandt et al. | 188/70 R |
| 2012/0205209 A1* | 8/2012 | Tsuzuku et al. | 188/325 |
| 2014/0020997 A1* | 1/2014 | Bach et al. | 188/325 |
| 2015/0152928 A1* | 6/2015 | Yoon | F16D 51/00 188/325 |

FOREIGN PATENT DOCUMENTS

| | | |
|---|---|---|
| JP | 10-325429 A | 12/1998 |
| JP | 2001-504417 A | 4/2001 |
| JP | A-2006-132616 | 5/2006 |
| JP | A-2006-170241 | 6/2006 |
| JP | A-2009-133382 | 6/2009 |
| JP | 2011-099458 A | 5/2011 |

OTHER PUBLICATIONS

Machine Translation of JP 2009-133382 (no date).*
A Japanese Office Action (with English-language translation) dated Apr. 21, 2015 that issued in Japanese patent application No. 2011-272923.
Chinese Office Action dated May 4, 2015, including English-language translation.

* cited by examiner

DRUM BRAKE TYPE ELECTRIC PARKING BRAKE APPARATUS

BACKGROUND

The invention is related to a drum brake type electric parking brake apparatus that expands a gap between a pair of brake shoes to generate a braking force by an electric motor. Specifically, the invention is related to a drum brake type electric parking brake apparatus capable of realizing a structure that can suppress the number of parts thereof, thereby reducing the cost of the apparatus.

In addition, the drum brake type electric parking brake apparatus that is the subject of the invention includes not only a structure in which a drum brake is used for both a service brake for decelerating or stopping a vehicle from a traveling state and a parking brake for keeping a stopped state but also a drum-in disc brake in which a disc brake is used for the service brake and only a drum brake is used for the parking brake.

A parking brake apparatus that keeps a vehicle at a stopped state without pressing a brake pedal is embedded in a drum brake. Also, a parking brake operation is also mechanically (non-hydraulically) performed through a force-multiplication mechanism such as link mechanism in which an electric motor is used as a drive source (for example, Patent Documents 1 and 2), which is implemented in some vehicles. For example, Patent Document 1 discloses a structure in which a hydraulic disc brake is used as a service brake and a mechanical drum brake having an electric motor as a drive source is used as a parking brake.

The drum brake type electric parking brake apparatus disclosed in Patent Documents 1 and 2 expands a gap of a pair of brake shoes, which is supported to an outer-side surface of a backing plate so that the backing plate can be displaced in a radial direction, by an electric actuator unit. The electric actuator unit is configured by a combination of an electric motor and a decelerator and expands a gap between one end portions of both brake shoes in a circumferential direction by a force-multiplication mechanism such as link mechanism, based on activation of the electric motor.

In the drum brake type electric parking brake apparatus that has been conventionally known, including the structures disclosed in Patent Documents 1 and 2, the electric actuator unit is supported and fixed to the backing plate. The backing plate is coupled and fixed to a knuckle consisting of a suspension with the electric actuator unit being fixed. Therefore, regarding the knuckle, a knuckle having a shape capable of preventing an interference with the electric actuator unit and coupling and fixing the backing plate should be used. Since the knuckle having the shape is special and a dedicated member should be thus newly made, the cost is inevitably increased regarding the mounting of the drum brake type electric parking brake apparatus.

In addition Patent Document 3 also discloses a structure that relates to the implementation of the invention, in addition to Patent Documents 1 and 2.

[Patent Document 1] JP-A-2001-504417
[Patent Document 2] JP-A-2011-099458
[Patent Document 3] JP-A-10-325429

SUMMARY

It is therefore one advantageous aspect of the present invention to provide a drum brake type electric brake apparatus having a structure capable of being mounted to a vehicle with suppressing a cost for manufacturing a knuckle.

According to one aspect of the invention, there is provided a drum brake type electric parking brake apparatus comprising:

a knuckle, configured to perform as a suspension of a vehicle;

a backing plate, supported and fixed to the knuckle;

a pair of brake shoes, supported to an outer-side surface of the backing plate, and configured to be displaced in a direction in which the brake shoes are separated from each other;

a drum, provided to surround the brake shoes, and configured to rotate together with a wheel;

an anchor, fixed between one end portions of the brake shoes in a circumferential direction of the drum at a part of the outer-side surface of the backing plate, and configured to receive a brake torque applied to the brake shoes due to a friction between linings of the brake shoes and an inner circumferential surface of the drum; and an electric actuator unit, including an electric motor and a decelerator, and configured to expand a gap between the one end portions of the brake shoes based on activation of the electric motor, wherein the electric actuator unit is separately provided from the backing plate, the electric actuator unit is arranged at an inner-side surface of the knuckle and the backing plate is arranged at an outer-side surface of the knuckle, and the backing plate and the electric actuator unit are supported and fixed to the knuckle.

The drum brake type electric parking brake apparatus may be configured such that: the anchor, the backing plate, the electric actuator unit and the knuckle are formed with respective first through holes; and a bolt is inserted through the first through holes to fix the anchor, the backing plate and the electric actuator unit to the knuckle.

The drum brake type electric parking brake apparatus may be configured such that: the backing plate and the knuckle are formed with respective second through holes; and an output member which is inserted through the second through hole connects an output part of the electric actuator unit to an input part of an expansion and contraction mechanism configured to expand and contract the gap between the one end portions of the brake shoes.

The drum brake type electric parking brake apparatus may be configured such that: one of the first through hole is a screwed hole having a female screw; and the bolt is screwed with the female screw to fix the anchor, the backing plate and the electric actuator unit to the knuckle.

DETAILED DESCRIPTION OF EXEMPLIFIED EMBODIMENTS

Figure 1:
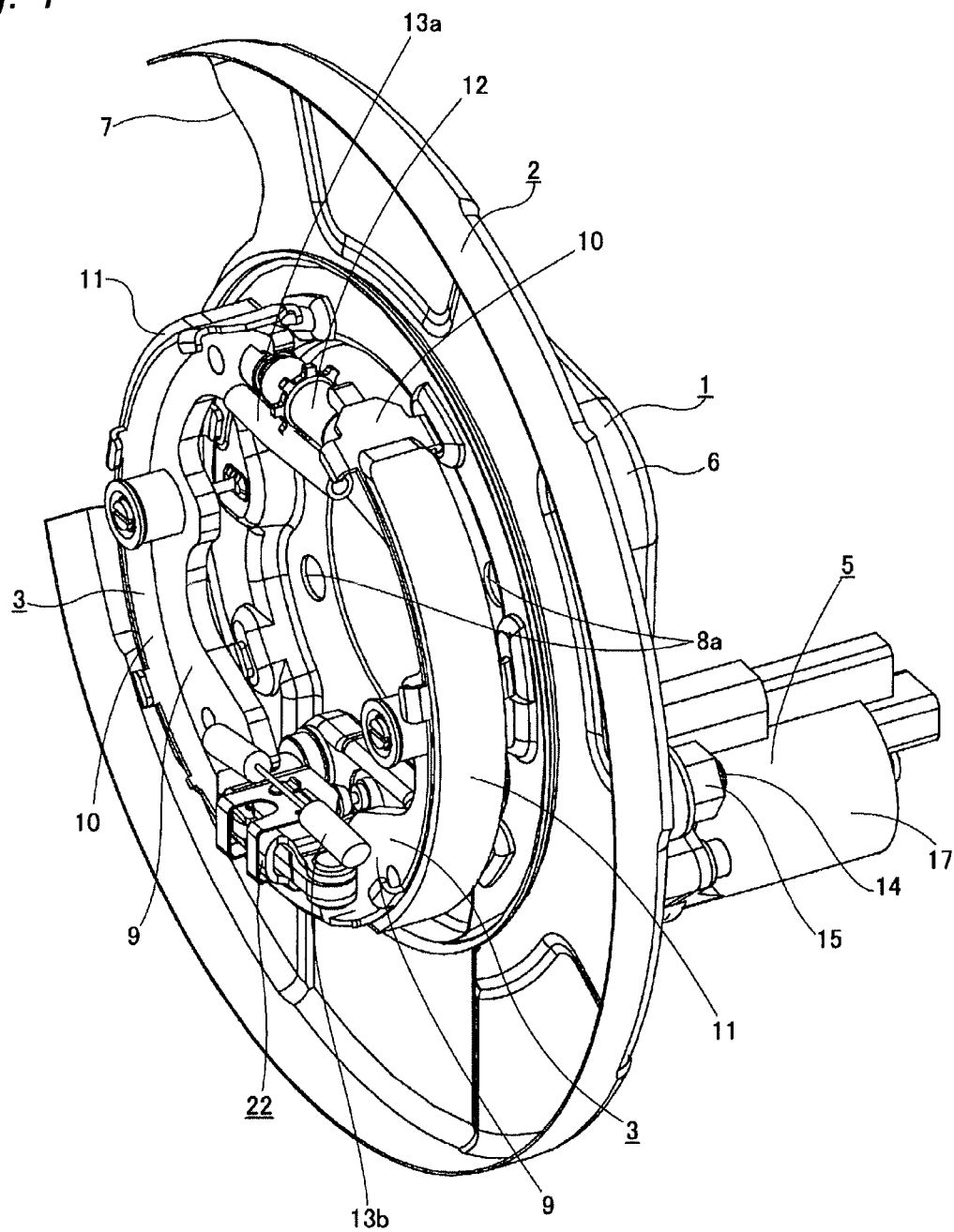
FIG. 1 is a perspective view showing an embodiment of the invention, which is seen from an outer-side and from a radially outside, with a drum being omitted.
Figure 2:
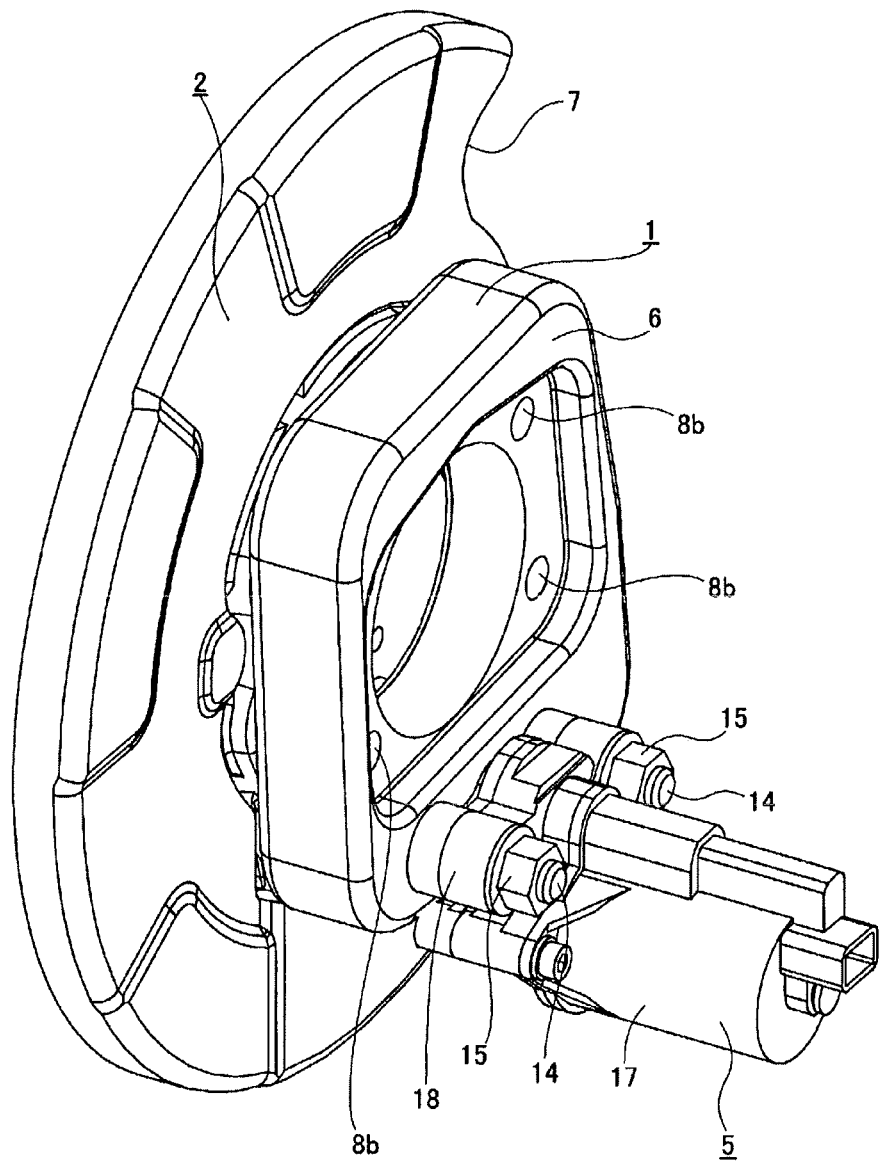
FIG. 2 is a perspective view showing the embodiment, which is seen from an inner-side and from a radially outside, with the drum being omitted.
Figure 3:
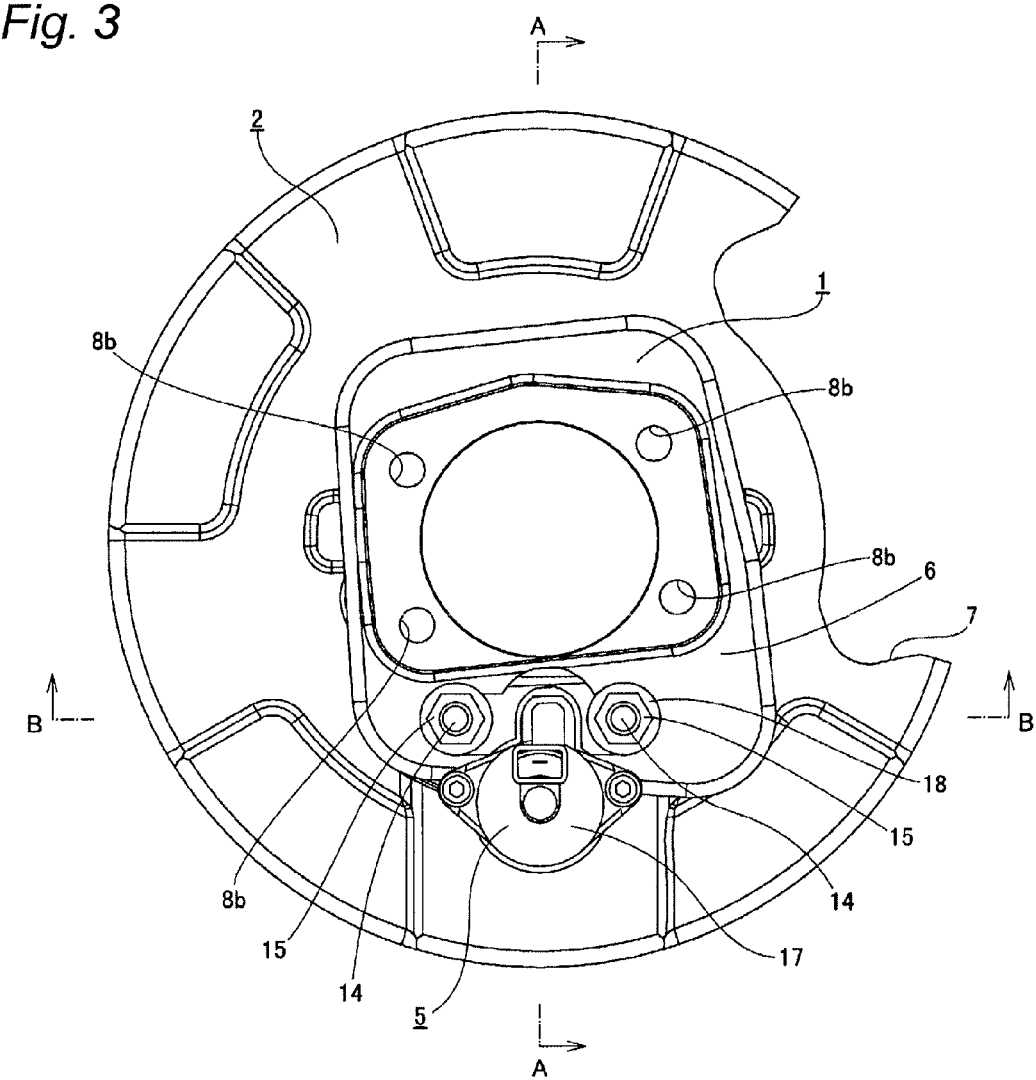
FIG. 3 is an orthographic view showing the embodiment, which is seen from the inner-side, with the drum being omitted.

FIGS. 1 to 10 show an example of an embodiment of the invention. In this embodiment, a case is shown in which the invention is applied to a drum-in disc brake. A drum brake type electric parking brake apparatus of this embodiment has a knuckle 1, a backing plate 2, a pair of brake shoes 3, 3, a drum (not shown), an anchor 4 and an electric actuator unit 5.

The knuckle 1 consists of a suspension of a vehicle and has a frame part 6 having a frame shape. A wheel is rotatably supported to an outer-side surface of the frame part 6 by a hub unit (not shown). The hub unit may be a double row rolling bearing unit for wheel support. The hub unit couples and fixes a fixed flange, which is fixed on an outer circumferential surface of an outer ring that is a non-rotating ring, to the frame part 6 by a bolt and couples a wheel and the drum (not shown) to a rotating flange that is provided to a part of an outer circumferential surface of a hub (inner ring) that is a rotating ring, the part protruding from the outer ring to an outer side in an axial direction. Since the structure and operation of the members that rotatably support the wheel and the drum to the frame part 6 of the knuckle 1 are disclosed in many publications such as Patent Document 3 and are well known, they are not shown and the detailed descriptions thereof are omitted. Meanwhile, in the drawings, a knuckle arm is not shown and only the frame part 6 having a frame shape for supporting a wheel is shown so as to easily understand the characteristic features of the invention.

The backing plate 2 is formed to have a substantially circular shape, a part of which being chipped near an outer peripheral edge thereof. The backing plate 2 has a bent part at the outer peripheral edge and a step part at a predetermined part. The backing plate 2 is formed by pressing a metal plate having sufficient strength and rigidity such as steel plate. Thereby the bending rigidity of the backing plate 2 is improved. In addition, a cut part 7 formed at a part near the outer peripheral edge is formed so that a support or caliper consisting of a disc brake that is a service brake is arranged. Also, through holes 8a, 8b are formed in the backing plate 2, a part near an inner peripheral edge of the frame part 6 of the knuckle 1 and the fixed flange, at a plurality of positions (four positions, in the drawings). The respective positions of each of the backing plate 2, the frame part 6 and the fixed flange are matched each other in a circumferential direction of the wheel. The backing plate 2, the frame part 6 and the fixed flange are coupled and fixed each other by screwing and tightening bolts and nuts (not shown) inserted into the respective through holes 8a, 8b. In addition, instead of the tightening bolts and the nuts, through holes 8a, 8b of one of the backing plate 2, the frame part 6 and the fixed flange may be screwed to form a female screw so that the tightening bolts are screwed therewith.

Also, each of the brake shoes 3, 3 includes a web 9 (a base member) having a substantially crescent shape, a back plate 10 fixed along an outer peripheral edge of the base member 9 and a lining 11 fixed on an outer peripheral surface of the back plate 10. The brake shoes 3, 3 are supported to an outer-side surface of the backing plate 2 so that the backing plate 2 is radially displaced. In this embodiment, a duo servo type is used as the drum brake consisting of the parking brake apparatus. Therefore, one end portions (lower end surfaces in FIG. 7) of the base members 9, 9 of the brake shoes 3, 3 in the circumferential direction are contacted (anchor-side upon braking and upon non-braking) to or arranged to closely face (opposite anchor-side upon the braking) both circumferential end portions (left and right end faces in FIG. 7) of the anchor 4 fixed on the outer-side surface of the backing plate 2. Also, the other end portions (upper circumferential end surfaces in FIG. 7) of the base members 9, 9 of the brake shoes 3, 3 in the circumferential direction are brought into contact with both axial end faces of a floating anchor 12 in an axial direction of the floating anchor 12. Also, return springs 13a, 13b are provided between the base members 9, 9, of the brake shoes 3, 3, thereby applying an elastic force to the brake shoes 3, 3 in a radially inner direction (braking release direction).

The drum is provided to surround the brake shoes 3, 3 with being coupled and fixed to the rotating flange of the hub unit and rotates with the wheel. Since the structure of this embodiment is a drum-in disc brake, a drum in which a disc is integrally provided on the outer periphery of the drum is used. A pair of pads, which is supported to the support or caliper arranged in the cut part 7 of the backing plate 2, is arranged to interpose the disc therebetween from both sides in the axial direction. When the service brake operates, the disc is strongly held at both sides by both the pads.

Also, the anchor 4 is fixed by two bolts 14, 14 and nuts 15, 15 between the one end portions of the brake shoes 3, 3 at a part of the outer-side surface of the backing plate 2. In this embodiment, the anchor 4, the backing plate 2 and the frame part 6 of the knuckle 1 are coupled and fixed by the bolts 14, 14 and the nuts 15, 15 and the electric actuator unit 5 is also coupled and fixed to the frame 6 by the bolts 14, 14 and the nuts 15, 15. That is, according to this embodiment, unlike the conventional structure disclosed in Patent Document 1, the electric actuator unit 5 is not directly fixed to the backing plate 2. The electric actuator unit 5 and the backing plate 2 are independently formed, and are coupled and fixed by the bolts 14, 14 and nuts 15, 15 with the frame 6 being interposed therebetween.

Through holes 16a, 16b, 16c are formed in the backing plate 2, the frame part 6 and the anchor 4, at a plurality of positions. Further, through holes 16d, 16d are formed in the attachment flange 18 of a unit case 17 of the electric actuator unit 5 at positions corresponding to the positions of the through holes 16a, 16b, 16c. The respective positions of each of the backing plate 2, the frame part 6 and the anchor 4 are matched each other. The anchor 4 is supported and fixed to the frame part 6 through the backing plate 2 by the bolts 14, 14 and nuts 15, 15, thereby brake torque applied to the brake shoes 3, 3 due to friction between the linings 11, 11 of the brake shoes 3, 3 and an inner circumferential surface of the drum is received. In addition, the attachment flange 18 or anchor 4 may be formed with screw holes to thus omit the nuts 15, 15.

Figure 4:
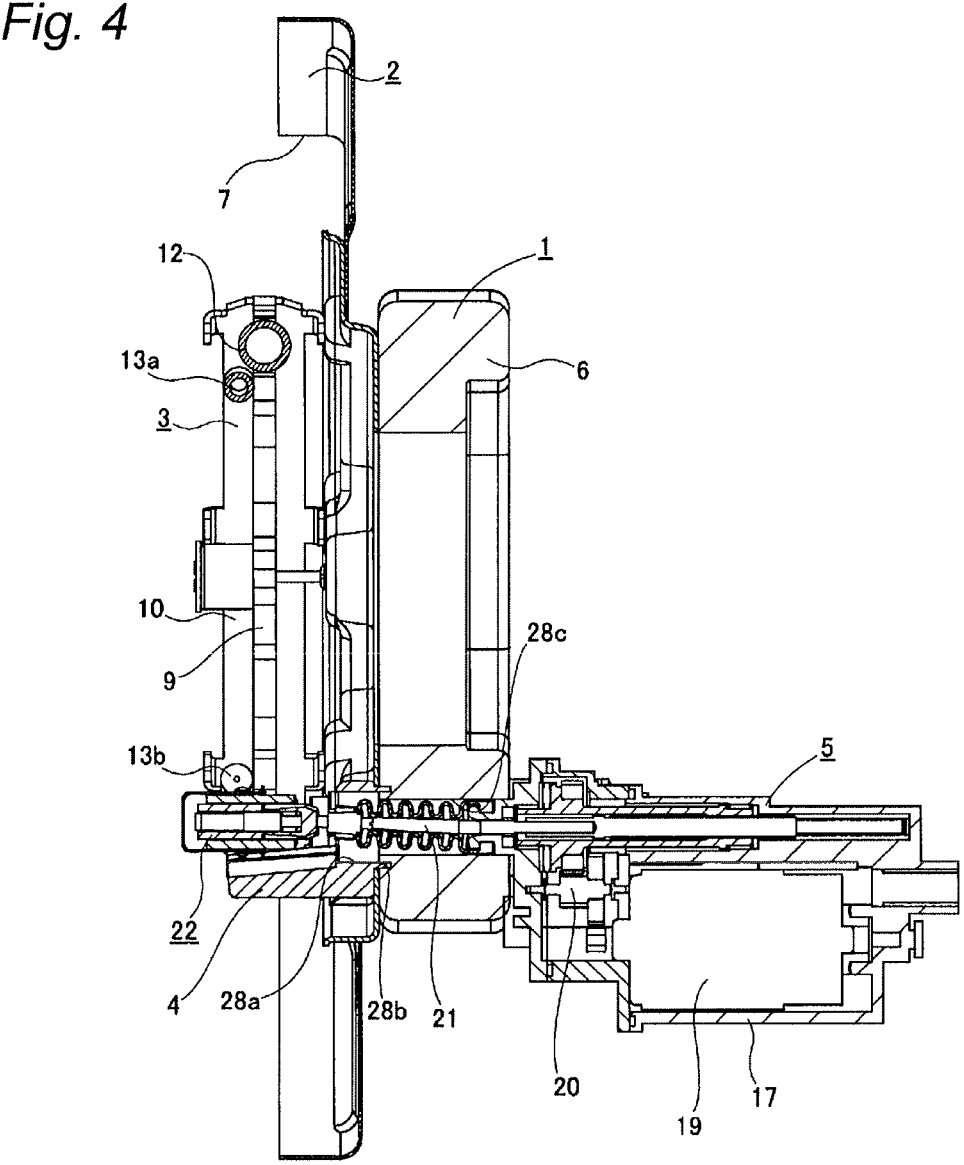
FIG. 4 is a sectional view taken along a line A-A of FIG. 3.
Figure 5:
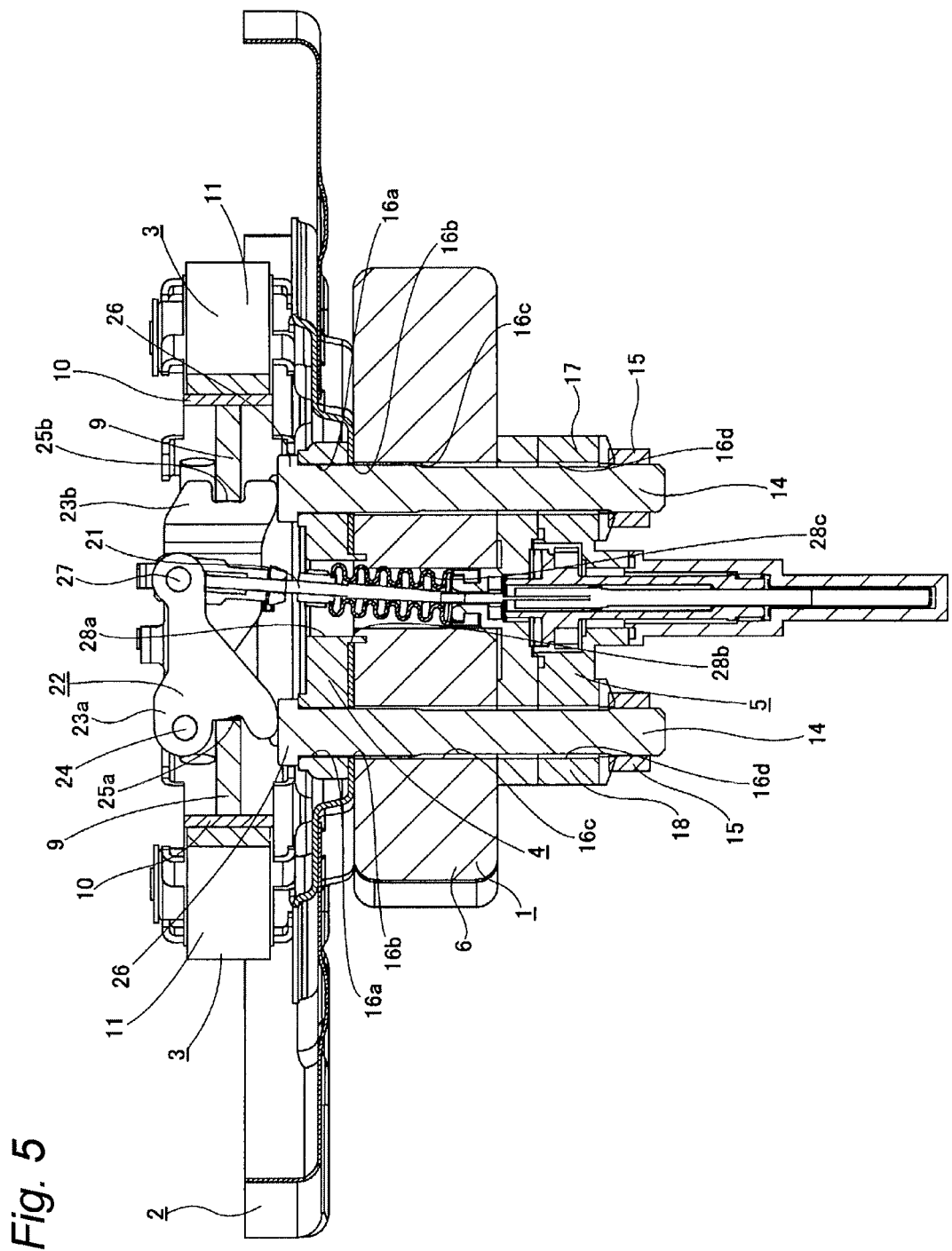
FIG. 5 is a sectional view taken along a line B-B of FIG. 3.
Figure 6:
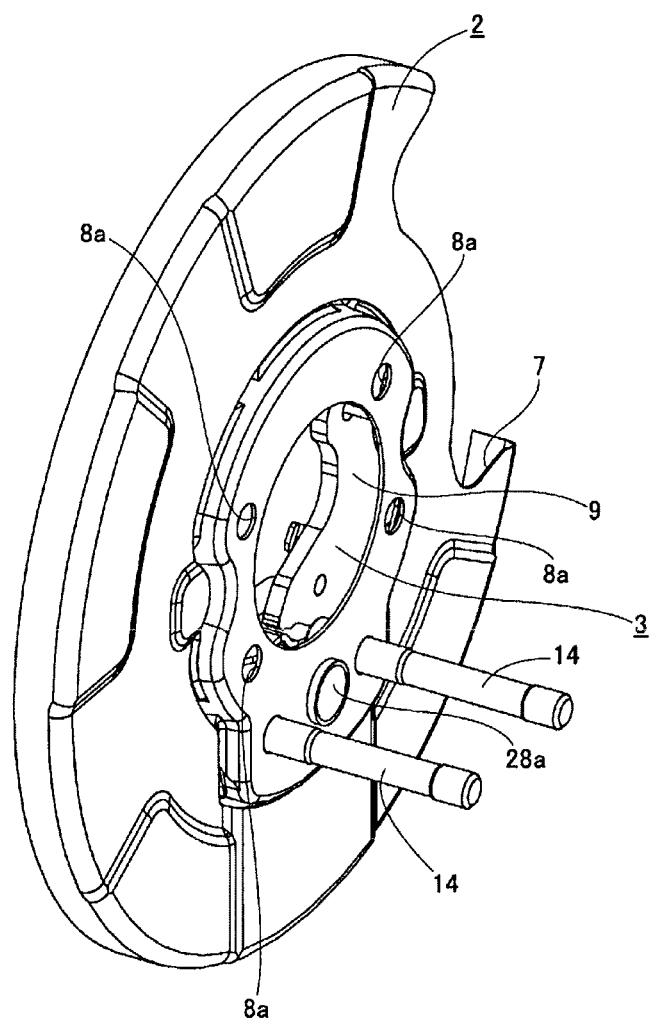
FIG. 6 is a perspective view, which is seen from the same direction as FIG. 2, with a knuckle and an electric actuator unit being omitted.
Figure 7:
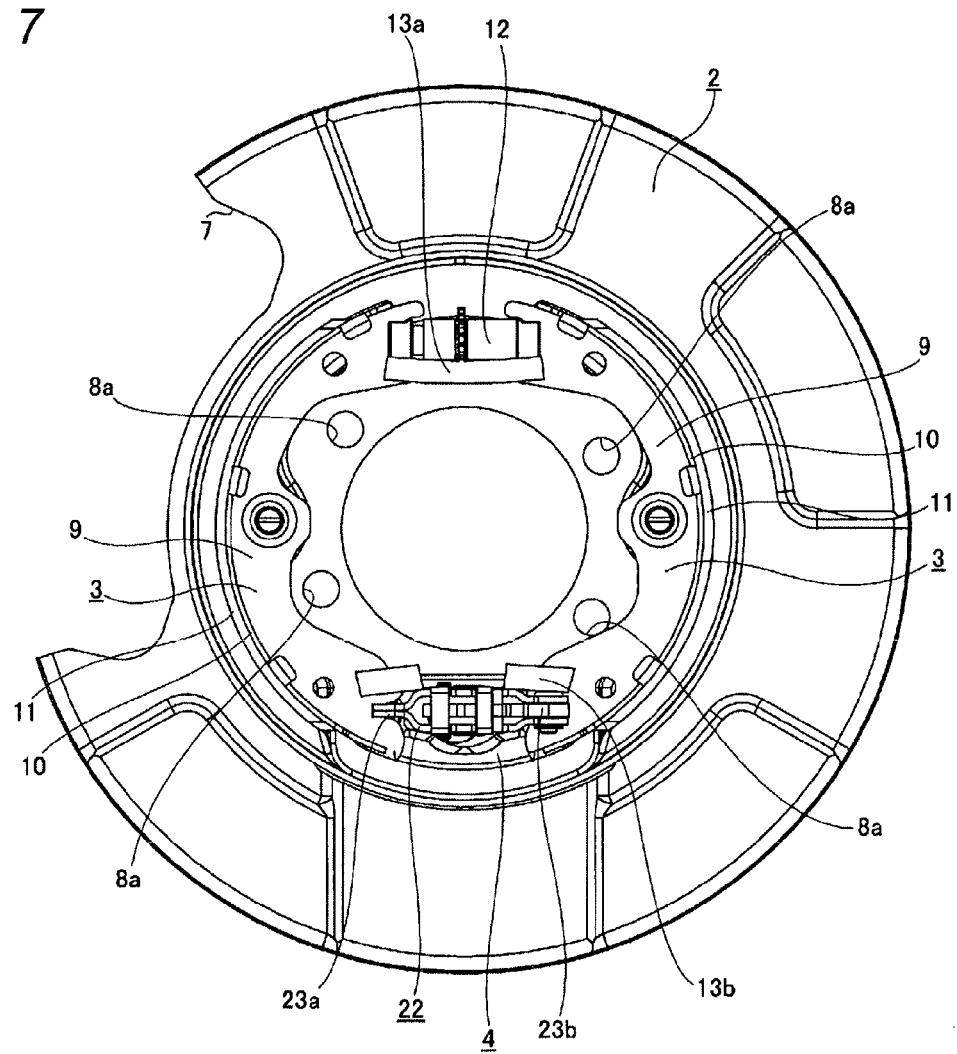
FIG. 7 is an orthographic view, which is seen from an outer-side, with the knuckle and the electric actuator unit being omitted.
Figure 8:
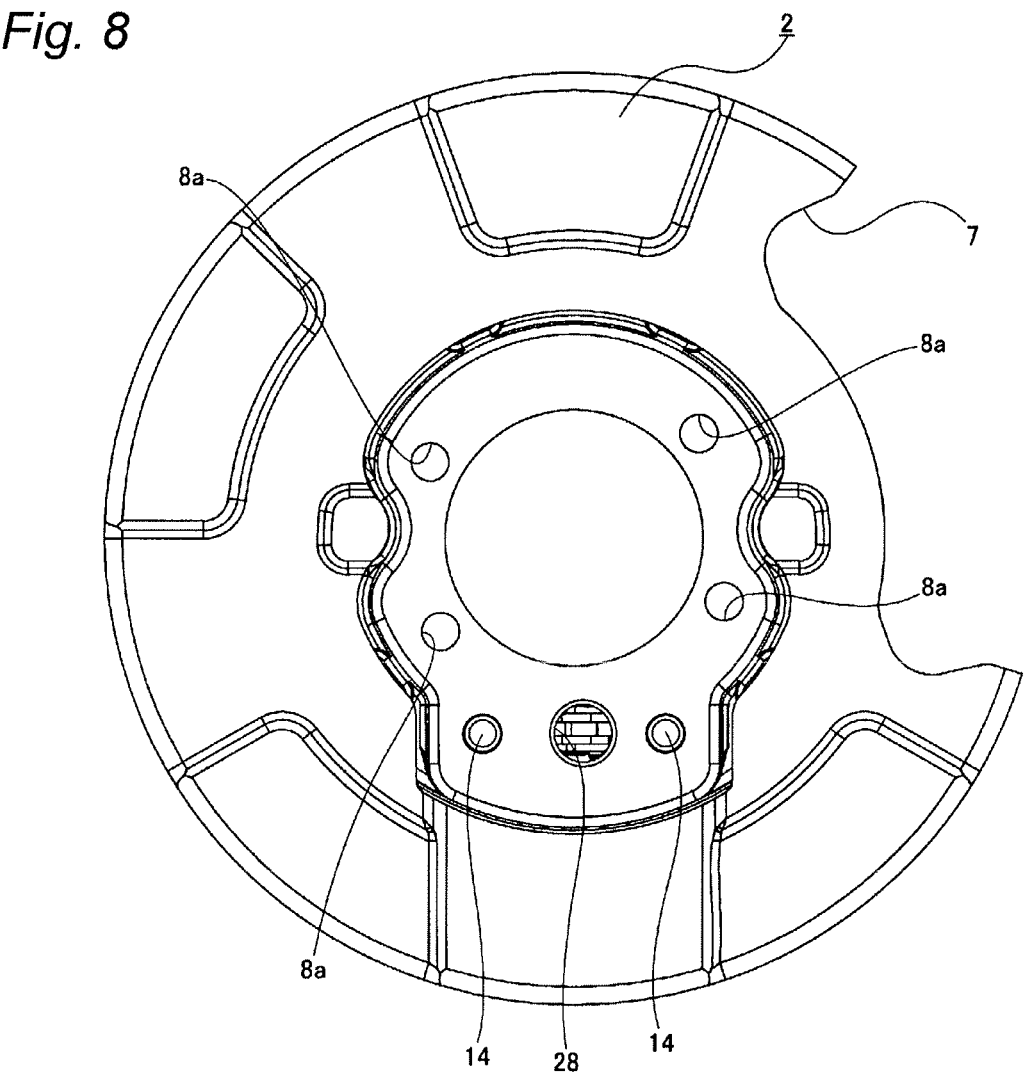
FIG. 8 is an orthographic view, which is seen from an inner-side, with the knuckle and the electric actuator unit being omitted.
Figure 9:
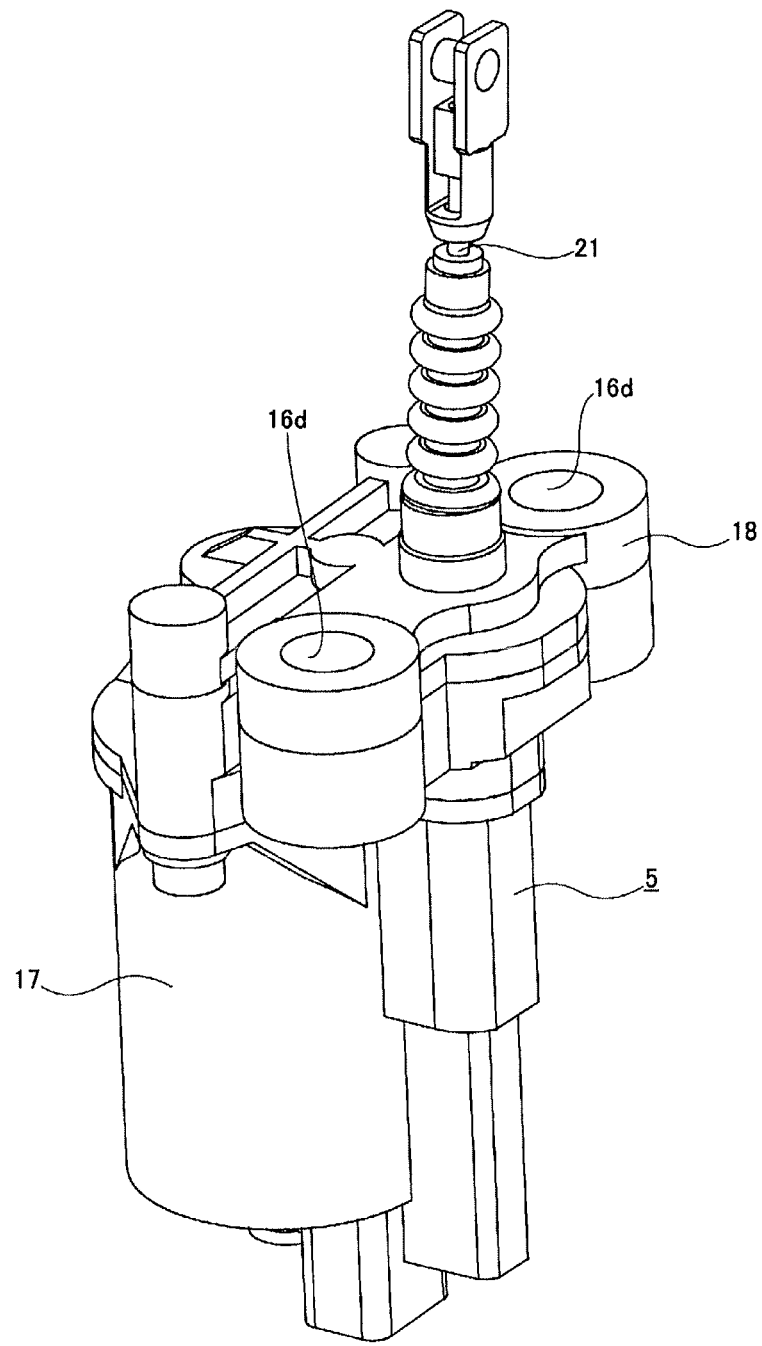
FIG. 9 is a perspective view showing the electric actuator unit, which is seen from the outer-side.
Figure 10:
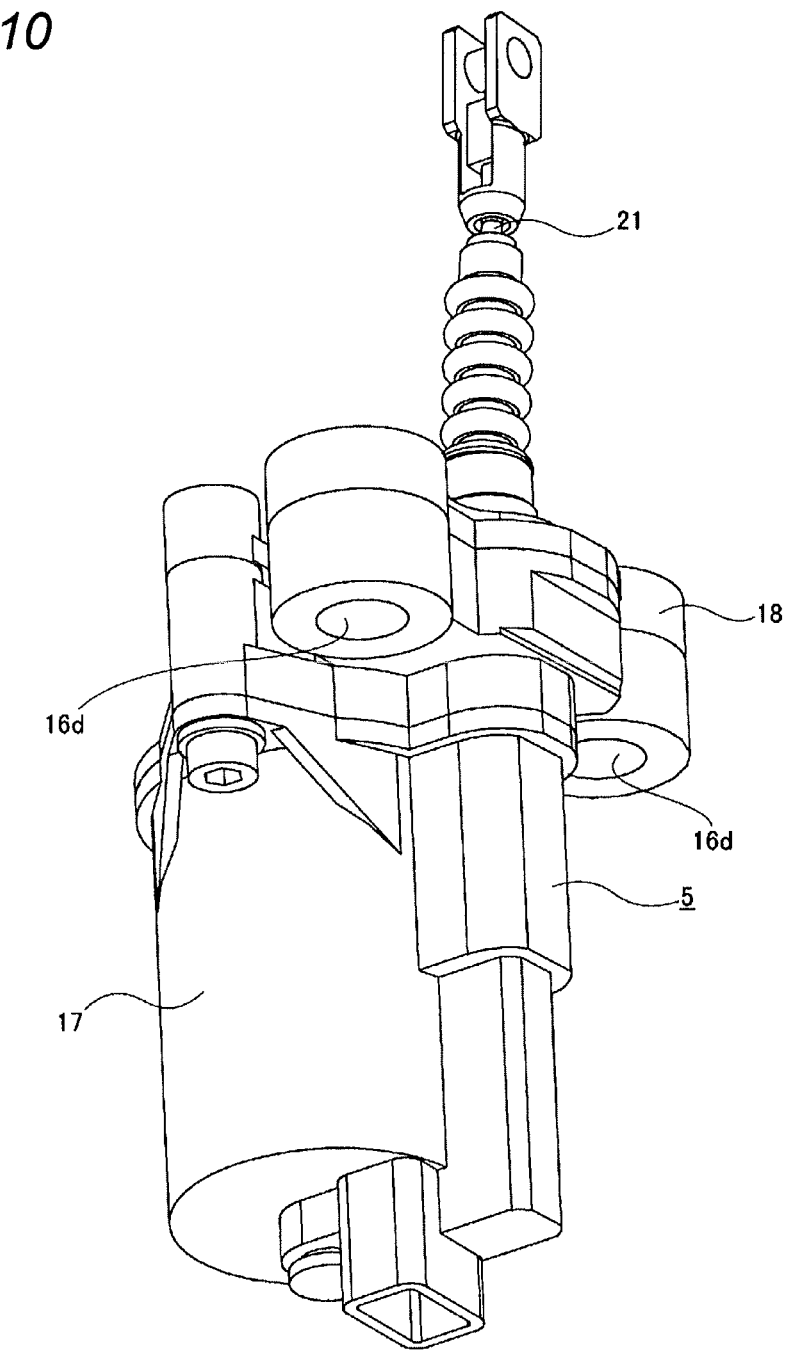
FIG. 10 is a perspective view showing the electric actuator unit, which is seen from the inner-side.

Also, as shown in FIG. 4, the electric actuator unit 5 includes an electric motor 19 and a gear-type decelerator 20. The electric actuator unit has a function of tensioning an output member 21, based on activation of the electric motor 19, and thus expanding the gap between the one end portions of the brake shoes 3, 3. The output member 21 has the sufficient strength and rigidity against the force in the tensioning direction and may have high bending rigidity such as rod or may have flexibility such as cable.

A link-type expansion mechanism 22 is provided between the one circumferential end portions of the brake shoes 3, 3 so as to expand the gap between the one end portions of the brake shoes 3, 3 as the electric actuator unit 5 tensions the output member 21 upon the operation of the parking brake. The expansion mechanism 22 has a structure that has been generally implemented in a technical field of the parking brake apparatus of the drum brake and includes a pair of link arms 23a, 23b that is rotatably coupled by a pivot shaft 24. Also, the one ends of the brake shoes 3, 3 are contacted to engaging recess portions 25a, 25a, which are formed at base end edges (opposite end edges) of the link arms 23a, 23b, and parts adjacent to the engaging recess portions 25a, 25b are contacted to end faces of head parts 26, 26 of the bolts 14, 14. Also, a tip of the output member 21 is coupled to a tip of one link arm 23a (left link arm in FIG. 5) through a coupling shaft 27. Also, second through holes 28a, 28b, 28c are respectively formed in the anchor 4, the backing plate 2 and the knuckle 2 at a position where the anchor 4, the backing plate 2 and the knuckle 2 are matched each other. The output member 21 is inserted into the second through holes 28a, 28b, 28c. In addition, when forming a screw hole in the anchor 4, parts of the link arms 23a, 23b are contacted to parts deviating from the screw hole in the anchor 4.

According to the drum brake type electric parking brake apparatus as described above, it is possible to use the conventional knuckle 1, as it is or almost as it is, which has a drum brake having a mechanical type parking brake apparatus and which has been implemented heretofore. That is, since the electric actuator unit 5 is separately configured from the backing plate 2 and the knuckle 1 is interposed between the electric actuator unit 5 and the backing plate 2, it is not necessary to form a hole in the knuckle 1, which is large enough to accommodate therein the electric actuator unit 5 (i.e., through which the electric actuator unit can be inserted). Regarding the hole that should be formed in the knuckle 1 so as to configure the drum brake type electric parking brake apparatus, it is only necessary to form the second through hole 28c for inserting the output member 21 therethrough. When the expansion mechanism of the non-electric parking brake apparatus, which has been originally provided, has the same structure as the expansion mechanism 22, since the second through hole 28c is originally formed in the knuckle 1, it is possible to use the knuckle, as it is. Hence, it is possible to use the conventional structure, as it is. Even if the structures of the expansion mechanisms are different and thus the second through hole 28c is not originally formed in the knuckle 1, it is only necessary to form the second through hole 28c. Accordingly, even in this case, it is possible to implement the drum brake type electric parking brake apparatus without largely changing the conventional structure and without using a special part for using the conventional structure. As a result, it is possible to reduce the cost of the drum brake type electric parking brake apparatus.

The invention is not limited to the drum-in disc brake as shown and can be also implemented with a structure in which both the service brake and the parking brake are configured by the drum brake. Also, the structure of the drum brake is not limited to limited to the duo servo type as shown and the other structure such as leading trailing type and two leading type may be also adopted.

What is claimed is:

1. A drum brake electric parking brake apparatus comprising:
   a knuckle, configured to perform as a suspension of a vehicle, formed with a concave portion at an inner-side surface thereof;
   a backing plate, supported and fixed to the knuckle;
   a pair of brake shoes, supported to an outer-side surface of the backing plate, and configured to be displaced in a direction in which the brake shoes are separated from each other;
   a drum, provided to surround the brake shoes, and configured to rotate together with a wheel that is rotatably supported to an outer-side surface of the knuckle;
   an anchor, fixed between one end portions of the brake shoes in a circumferential direction of the drum at a part of the outer-side surface of the backing plate, and configured to receive a brake torque applied to the brake shoes due to a friction between linings of the brake shoes and an inner circumferential surface of the drum; and
   an electric actuator unit, including an electric motor and a decelerator, and configured to expand a gap between the one end portions of the brake shoes based on activation of the electric motor, wherein
   the electric actuator unit is supported and fixed to the inner-side surface of the knuckle and the knuckle is entirely arranged at an inner-side surface of the backing plate such that the electric actuator unit is not directly fixed to the backing plate,
   the backing plate and the knuckle are formed with respective first through holes through which a fixing member is inserted to fix the backing plate to the knuckle, and
   the first through holes are disposed at a bottom surface of the concave portion.

2. The drum brake electric parking brake apparatus according to claim 1, wherein
   the anchor, the backing plate, the electric actuator unit and the knuckle are formed with respective second through holes, and
   a bolt is inserted through the second through holes to fix the anchor, the backing plate and the electric actuator unit to the knuckle.

3. The drum brake electric parking brake apparatus according to claim 2, wherein
   the backing plate and the knuckle are formed with respective third through holes, and
   an output member which is inserted through the third through hole connects an output part of the electric actuator unit to an input part of an expansion and contraction mechanism configured to expand and contract the gap between the one end portions of the brake shoes.

4. The drum brake electric parking brake apparatus according to claim 2, wherein
   one of the second through holes is a screwed hole having a female screw, and
   the bolt is screwed with the female screw to fix the anchor, the backing plate and the electric actuator unit to the knuckle.

\* \* \* \* \*